INVENTORS
WILLIAM G. HYZER
BY ERNEST M. WHITLEY
Schapp & Hatch
ATTORNEYS

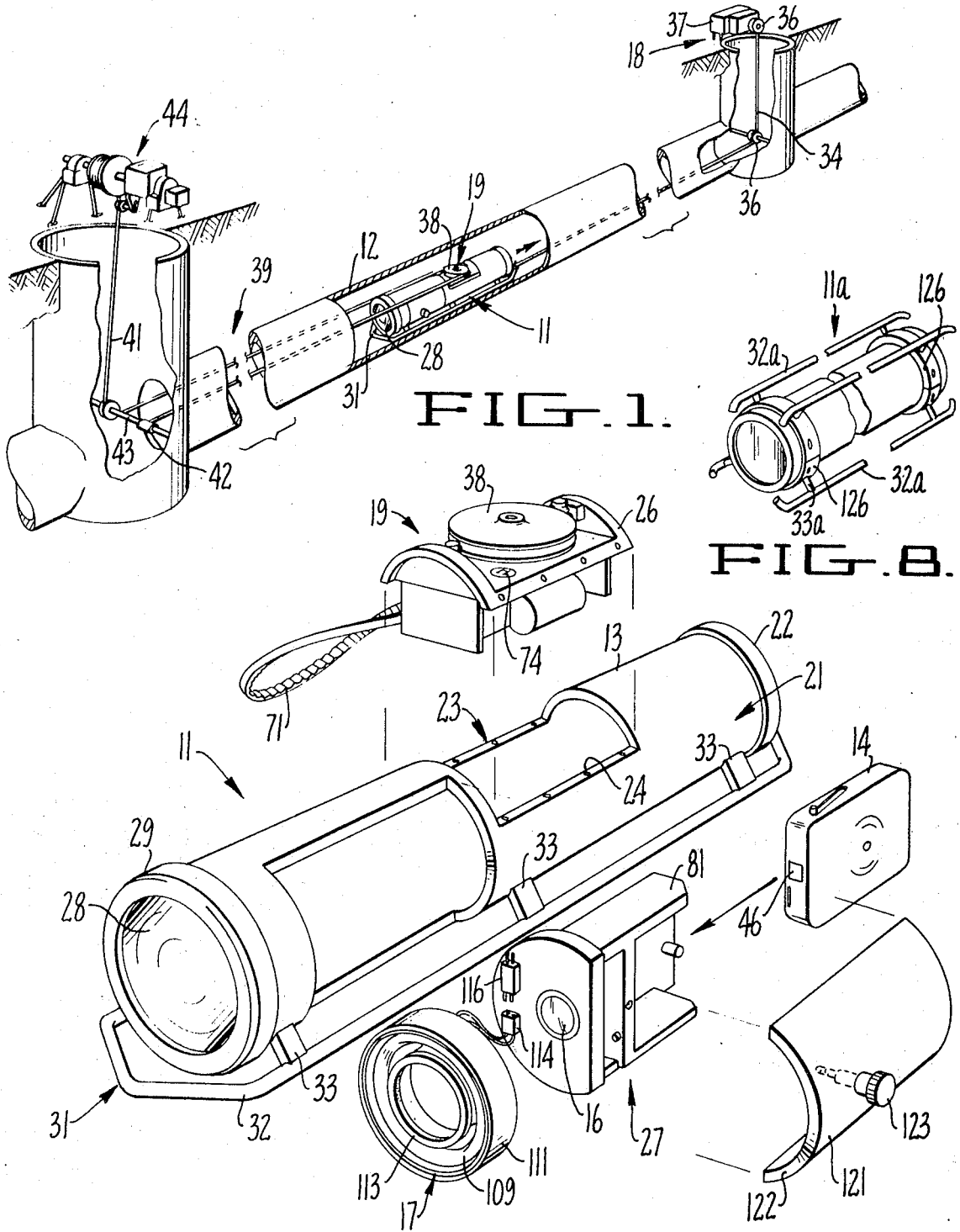

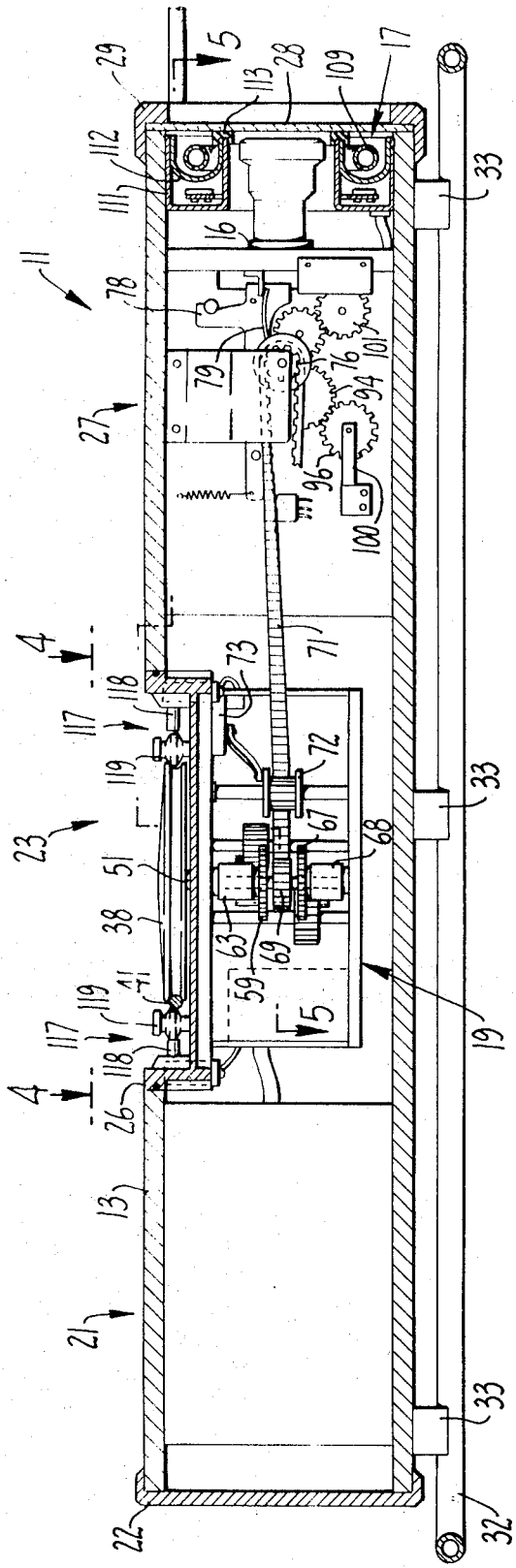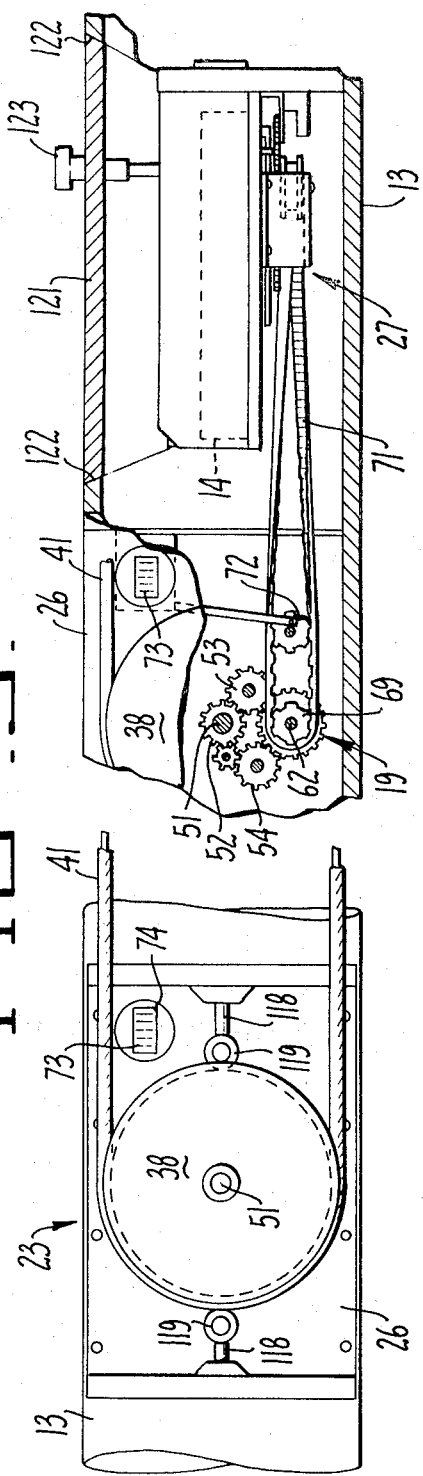

3,621,767
PIPE CAMERA FOR PHOTOGRAPHING THE INTERIOR OF A PIPE OR THE LIKE
William G. Hyzer, 136 S. Garfield, Janesville, Wis. 53545, and Ernest M. Whitley, 3061 Stelling Drive, Palo Alto, Calif. 94303
Filed June 11, 1969, Ser. No. 832,253
Int. Cl. G03b 9/70
U.S. Cl. 95—11.5 R                                17 Claims

ABSTRACT OF THE DISCLOSURE

A pipe camera for photographing the interior of a pipe or the like at regular intervals comprising a watertight housing, a transport device for moving the camera through the pipe, and a camera drive mechanism for operating the camera independently of the transport device but in response to movement of the camera through the pipe. The transport device consists of a tow line and skid members which are detachably secured to the camera housing. The camera drive mecahnism includes a pulley, a train of drive elements for interconnecting the pulley with the film advance, the shutter and the flash element of the camera, and a clutch arrangement for providing a single direction of operation of the drive elements irrespective of the direction of rotation of the pulley. The operation of the flash element is synchronized with the opening of the shutter. A counter may also be connected to the train of drive elements for indicating the degree of camera movement through the pipe.

BACKGROUND OF THE INVENTION

The present invention relates to a pipe camera for photographing the interior of a pipe or the like, and more particularly to a pipe camera suitable for photograph ing the entire interior of a pipe with the photographs being taken at regularly spaced intervals so that the pipe can be examined and irregular situations such as pipe damage accurately located.

Camera of this general classification are well known, and they are utilized in horizontal sewere pipes, or in vertical pipes such as oil wells. The purpose of the camera is to provide an analyses of the interior of the pipe, and the reasons for the analyses may vary from the simple observation of the conditions therein to the location and determination of damage or the like. Such cameras must be constructed to perform a number of functions, and to perform them in a reliable manner. First of all, the camera should take pictures of the interior of the pipe in such a way that the entire interior is shown, the location of each frame known, and the pictures should be of good qaulity for accurate analysis. In addition, it is a feature of such cameras to provide light and automatically operate the camera from within. Most of these cameras do not utilize a shutter, the theory being that the pipe is sufficiently dark that exposure only occurs when a flash mechanism is fired. The flash mechanism is then controlled to fire at regular intervals and the film is also driven at regular intervals.

However, most of these structures have a number of disadvantages, and require careful operation. For example, when the shutterless camera is halted for a relatively long period of time, a frame may be lost by exposure of the film sufficiently to blur out or double expose the flash exposures in that area of the film strip. In addition, many of the prior mechanism were not accurate in relating the picture to the distance the camera traveled through the pipe, and this resulted in difficulty where repair is deemed necessary. For example, if the camera is drawn through sewer pipe, and a damaged pipe showing a leak is found about 125 feet from the nearest manhole, the repair crew would have to excavate in that area to get at the damage. If the damaged area is not accurately located, undue excavation may be necessary in order to bring the repair crew to the pipe at the desired location.

SUMMARY OF THE INVENTION

In accordance with the present invention, a pipe camera is provided which positively synchronizes the taking of pictures with the movement of the camera through the pipe so that all pictures may be accurately correlated distance wise and the location of the picture accurately determined. In addition, the present invention provides a rugged camera which is adapted to operate under conditions where corrosive liquid might be found, and yet which is absolutely reliable.

In accordance with the present invention, the camera is towed or pulled through the pipe with a mechanism separate from the mechanism utilized for operating the picture taking of the camera, the operation of the camera being positively synchronized with the camera movement. By utilizing such a separate mecahnism, variations caused by stretch of the tow rope or cable, and other factors are positively eliminated, and towing is facilitated. The separate structure synchronizing the picture taking procedure with the camera movement is then accurately set up for precision operation.

In its preferred form, the invention utilizes a special tow skid for towing the camera through the pipe, the tow skid being specially formed so as to positively prevent a hangup at pipe joints or the like, and yet formed to provide a relatively low friction sliding movement of a pipe camera through the pipe. In addition, it is preferred to provide skids which are adjustable or exchangeable to fit various sizes of pipe so that the camera may be approximately centrally loacted throughout various ranges of pipe size wtihout changing the camera configuration.

The mechanism for operating the camera preferably comprises a pulley mounted on the housing of the camera adapted to receive a metering rope which is anchored at one end and played out in taut fashion from the other end, the intermediate portion of the rope being placed around the pulley. In a typical operation, the tow rope will pull the camera through while the pulley rope will trail behind so as to maintain the pulley rope in taut condition at all times and positively relate axial movement of the camera to pulley rotation. The pulley is then attached to a drive train or chain such as a gear train or chain which accurately transmits the movement to the camera mechanism where the film is moved to provide successive frames in picture taking position, and a shutter and flash mechanism is actuated in a positively synchronous manner to expose each frame.

A feature of the invention is to provide a counter or odometer which is connected to the drive train so that the overall distance as measured by the unit can be read from manhole to manhole. This distance can be compared with the expected lineal distance and compensation made for bends of the pipe so that the location of each picture frame may be accurately determined.

Another feature of the invention is the provision of a special shutter trip mechanism which is operated from the drive train, the special construction providing for the shutter to trip instantaneously so that the shutter will not be left open when the camera is halted for any reason, and to allow proper exposure in the daylight areas at the manhole position. The film drive mechanism which moves the film may be more or less conventional, and we prefer to utilize a standard film magazine capable of advancing the film from drive receiving means adapted to be driven by the drive train.

Another feature of this invention is the provision of slip clutches in the drive train so that the pulley will drive in a positive direction regardless of the rotation of the pulley. In this way, the camera may be used in reverse fashion, and yet the drive train will positively actuate the drive receiving elements of the camera in a consistant manner.

Another feature of the invention is the provision of a window structure capable of providing picture taking from the end and preferably the rear end of the camera so that sections of the pipe may be seen in overlapping fashion and the entire pipe interior photographed. With this construction, a tubular flashlight is preferably utilized which is carried internally and shines light through the window toward the area being photographed, and the camera lens system sits within this tubular flashlight for providing the proper image focus on the film, Preferably, the lens system is isolated from the flash system internally of the camera and the isolation brought right up to the face of the window so as to prevent the flash from providing residual glare off the surfaces of window that will detract from proper exposure of the film.

Other features are built into the camera to provide foolproof operation, such as automatic switches for isolating the batteries from the flash system, the switches being closed when the pulley rope is in place so that the battery is automatically disconnected when the unit is pulled out of the sewer. In addition, easy open, yet liquid-tight, access doors are provided to render the internal mechanism readily available while also being protected.

From the foregoing description, it is seen that a primary object of the invention is to provide a pipe camera which will accurately photograph successive intervals of the pipe is precision fashion so that objectionable areas may be accurately located within the pipe.

Another object is to provide a camera of the character described which contains various safety features and is substantially foolproof in operation.

Still another object of the invention is the provision of the camera of a character described, in which special constructions are provided to insure excellent picture images, such as a positive shutter action, and flashlight isolation.

A further object of the invention is the provision of a pipe camera of the character described, which will take pictures through substantially the entire end of the camera so as to provide excellent symmetrical exposures.

A still further object of the invention is the provision of a pipe camera of the character described, which is equipped with a special skid mechanism for facilitating the movement of the camera through the pipe, and in which the skid mechanism may be made adjustable, if desired, so that the same camera may be centrally positioned in pipes of various diameters.

Further objects and advantages of the invention will be apparent as the specification progresses and the new and useful features of the pipe camera will be more fully defined in the claims attached hereto.

BRIEF DESCRIPTION OF THE DRAWINGS

The preferred forms of the invention are illustrated in the accompanying drawings forming a part of this description, in which:

FIG. 1 is a perspective view, with certain parts being broken away for clarity, showing a preferred form of pipe camera constructed according to this invention as it appears in use in a typical sewer system;

FIG. 2, an exploded perspective view illustrating the camera shown in FIG. 1;

FIG. 3, a vertical sectional view of the camera shown in FIGS. 1 and 2, but on an enlarged scale;

FIG. 4, a fragmentary plan view of a portion of the camera shown in FIG. 3 as indicated in the arrows 4—4 thereof;

FIG. 5, a fragmentary sectional view of the camera shown in FIG. 3 substantially as seen from the line 5—5 thereof;

FIG. 8, an alternate form of a pipe camera illustrating a modified form of skid structure.

Figure 6:
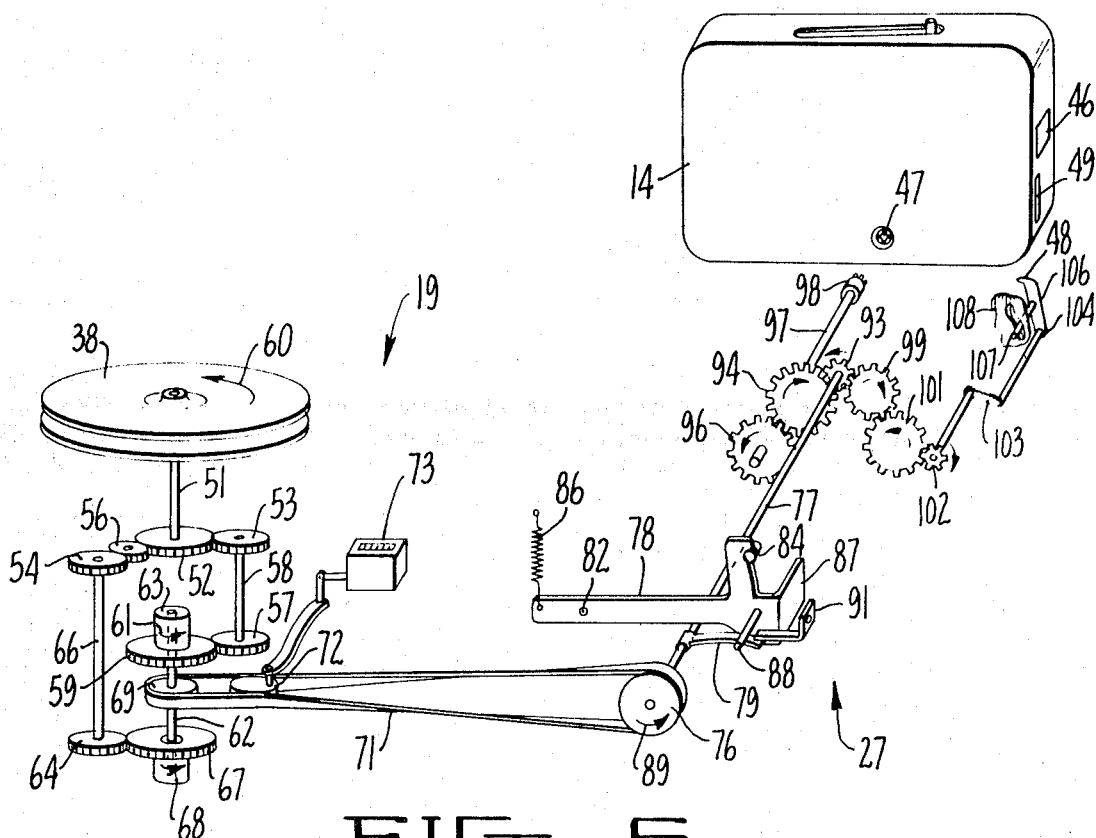
FIG. 6, a diagrammatic view of the drive mechanism of the camera shown in FIGS. 1 through 5, illustrating the mechanical cooperation between elements thereof.

While only the preferred forms of the invention are shown, it should be understood that various changes or modifications may be made within the scope of the claims attached hereto without departing from the spirit of the invention.

DESCRIPTION OF THE PREFERRED EMBODIMENTS

Referring to the drawing in greater detail and particularly to FIGS. 1 and 2, there is shown a pipe camera 11 formed for photographing the interior of a pipe 12 at regular intervals, comprising a watertight housing 13 carrying a cassette 14 equipped with an internal film drive mechanism, a lens 16 and flash mechanism 17, means 18 for moving the camera through the pipe, and a camera drive mechanism 19 separate from the means for moving the camera but responsive to the motion of the camera for driving the camera parts whereby pictures are taken at accurately spaced intervals.

Referring more particularly to FIGS. 2 through 5, it is seen that the housing 13 of the pipe camera 11 is elongated and preferably cylindrical so as to provide a minimum width for the desired mechanism. These sections comprise a battery compartment section 21 having an access door 22 in the form of an end cap adapted to be sealingly fit against the housing 13 with suitable removable fasteners such as screws (not shown). Adjacent to the battery compartment, there is a central section 23 having an opening 24 at the upper side thereof for receiving a cover plate 26, which plate is secured by screws or the like for semipermanent attachment. However, the cover plate is removable for servicing the camera drive mechanism; a considerable portion of which is mounted under this cover plate 26.

At the other end of the housing 13, a camera mechanism 27 is provided to carry out the usual picture taking procedures frame by frame on a film strip. As here shown the camera mechanism 27 comprises the cassette 14, lens 16, flash mechanism 17, and associated parts mounted in position to take pictures through a window 28, which in turn is carried on an end cover 29 in semipermanent attachment.

With this arrangement of parts, considerable camera mechanism can be carried in a relatively small diameter housing, yet the camera is able to see through the end window and photograph an entire field of view including all internal walls of a short length of the pipe on each frame. In a typical operation, approximately six feet of internal length of the pipe is retained in excellent focus for each shot to provide complete and precision examination of the internal pipe structure and/or condition.

An important feature of this invention is the provision of a suitable mounting means for retaining the pipe camera 11 in proper axial orientation within the pipe, and yet provide assistance for camera movement through difficult areas. As here shown, a pipe camera mounting means 31 is provided in the form of a skid 32 which is attached to the housing 13 through suitable connecting members 33. The skids 32 are formed with elongated members extending substantially the length of the camera housing or beyond and parallel to the axes thereof so that a pair of skids can rest on the pipe 12 and hold the pipe camera 11 in axial alignment therewith. Another feature of the skids 32 is the provision of bent end portions 32 which may be joined together as shown in FIG. 2 so that the entire skid is a unitary flat structure containing parallel connecting members and curved ends suitable for receiving a hook or the like for towing.

The skid is not only used for supporting the camera in proper orientation and assisting in easy travel of the camera through the pipe, but it is also utilized as part of the means for moving the pipe camera, by attachment with the means 18 for moving the camera. As best seen in FIG. 1, means 18 comprises a cable or the like 34 whic his trained over suitable pulleys 36 and connected to a powered drive means 37. Since the pipe camera of this invention is provided with means absolutely synchronizing the pipe camera movement regardless of velocity, it is possible to utilize a hand powered windless or the like in place of the power drive means 37, if desired.

The camera drive mechanism 19 comprises a pulley 38 mounted on the cover plate 26 in the central portion 23 of the camera, and a pulley drive means 39 in the form of a rope-like element 41 adapted to be anchored at one end 42 to a suitable hold fast device 43, wrapped around the pulley 38 at an intermediate portion, and played out taut from the other end by a suitable device 44. As the rope plays out, it turns the pulley 38 so that the movement of the camera is exactly related to the pulley rotation. In order to render this movement precise, it is important that the rope-like element which maintains uniform length, and we prefer to use a steel core plastic covered aircraft type control cable.

By utilizing suitable stretch resistant ropes, precision relationship between camera movement and pulley rotation is maintained. In this way, the irregular tension which is encouraged in the tow cables as the camera is pulled through changing skidding conditions is independent of the operation of the camera drive mechanism. This construction is important in order to avoid or substantially eliminate errors which occur in prior devices due to the use of the tow cable for actuating the camera mechanism. It is also seen that by operating through the pulley and pulley drive means shown, the camera can be moved at a non-uniform velocity through the pipe or even halted without influencing the accurate spacing of the pictures taken within the pipe.

With the exception of the shutter, the camera mechanism itself is preferably composed of more or less conventional items such as a conventional flash mechanism and a conventional film drive mechanism, all of these mechanisms being actuated by and synchronized with the movement of pulley 38. Although certain of the camera mechanisms are preferably conventional, because these mechanisms have been developed in excellent form by the industry, it is a part of the present invention to provide means for the synchronizing and operation of these various parts through various drive receiving means thereon. This is achieved by the novel camera drive mechanism of this invention.

In the camera here shown, the cassette 14 is a standard cassette carrying a strip of movie film through a film gate adjacent an exposure aperture 46 with the gross film movement being achieved by rotating a drive receiving element 47 (see FIG. 6), and the film moved frame by frame past the aperture 46 by a suitable claw 48 operating through a slit 49.

Referring to FIG. 6 in greater detail, the camera drive mechanism 19 is shown diagrammatically in its preferred form. As here shown, the pulley 38 is carried on a shaft 51, which is fit sealingly through the cover plate 26 of housing 13 by suitable bearings so as to protect the interior mechanism from liquids and the like. At the end of shaft 51, is a spur gear 52 in direct drive with spur gear 53 and in indirect drive with spur gear 54 through gear 56 so that gears 53 and 54 rotate in opposite directions. Gear 53 is connected to gear 57 through shaft 58, with gear 57 driving gear 59. In this way, counterclockwise rotation of pulley 38 causes corresponding counterclockwise rotation of gear 59 as indicated by arrows 60 and 61. The gear 59 is connected to shaft 62 through a slip clutch 63 so that the shaft 62 is only driven in the counterclockwise direction shown.

When the pulley 38 is driven in a clockwise direction, it is seen that the slip clutch is operative so that the gear 59 does not drive the shaft 62. However, pulley 38 also drives gear 54 and a gear 64 both of which are carried on a shaft 66. Gear 64 then drives gear 67 so that gear 67 is driven counterclockwise when pulley 38 is driven clockwise. Gear 67 is also mounted on shaft 62 through slip clutch 68. With this arrangement, it is seen that the shaft 62 is driven counterclockwise no matter which direction pulley 38 is rotated. This is important in assuring that the various camera mechanisms are driven properly by positively providing that they will be driven in one direction only, since the various drive receiving elements are equipped for drive in only one direction.

Returning again to the camera drive mechanism 19 as illustrated in FIG. 6, there is shown a positive drive pulley or sprocket 69 on shaft 62 formed to drive a positive drive belt or gear belt 71. This positive drive belt 71 is passed over sprocket wheel 72 which in turn actuates a counter mechanism 73, which counter is carried inside the housing 13 and under a suitable window 74. In this way, the rotation of the pulley as translated into the actuating mechanism for operating the camera mechanism is positively counted and a record made thereof to indicate the lineal distance the camera moves, and the number of frames exposed. This counter is valuable in reckoning the various bends and the like in the pipe to assist in accurately locating areas requiring repair or the like.

Figure 7:
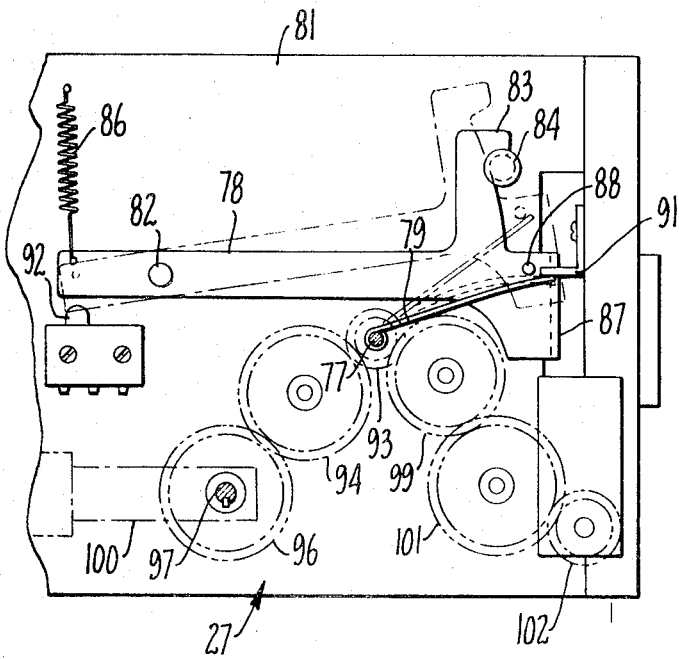
FIG. 7, an enlarged elevational view of a portion of the drive mechanism near the shutter trip mechanism and illustrating the actuation of the shutter and flash devices of the camera of FIGS. 1 through 6.

The positive drive belt 71 not only drives the counter, but also drives a sprocket wheel 76 which is carried on a shaft 77, which shaft and associated structure actuates the various camera mechanisms in proper synchronism. As best seen in FIGS. 6 and 7, a shutter trip arm and switch actuator 78 is mounted in position to be actuated by a leaf spring 79 mounted on and rotating with shaft 77. Shutter trip arm 78 is rotatably mounted on the main camera housing 81 through a pin 82, and the arm is formed with a hook 83 adapted to abut a stop pin 84, with the arm being urged toward the position of abutment with stop pin 84 by tension spring 86. Pin 84 is provided with an internal recess of sufficient width that the shank portion of hook 83 will fit therein and be restrained against unwanted lateral motion as the shutter trip arm 78 is moved back and forth in operation. Shutter trip arm 78 also contains a shutter in the form of a flange 87 at the end thereof for moving out of and back into a covering position over aperture 46, and a post 88 for receiving energy from the leaf spring 79 to actuate the trip arm.

The operation of shutter trip arm 78 is as follows: As shaft 77 is rotated by the drive chain from pulley 38, leaf spring 79 rotates therewith as indicated by arrow 89 on wheel 76. As the spring 79 rotates, it first contacts a fixed cocking stop 91 and bends in bow fashion as the rotation of shaft 77 continues while cocking stop 91 holds the end of the leaf spring in position. As the spring bends, its effective length between shaft 77 and stop 91 is shortened until the spring snaps off stop 91. When the spring is thus released, it strikes post 88, and forces shutter trip arm 78 to move quickly and immediately to the position shown in phantom in FIG. 7. With this movement, flange 87 operates as the shutter and at the same time, the spring end of trip arm 78 actuates a switch 92 causing the flash mechanism to fire. In this way, the gross movement of the pipe camera may be halted even for a considerable length of time near a picture taking position, yet the picture will be taken at the desired position and overexposure is possibly avoided.

In addition to operating the shutter and flash mechanism, rotating shaft 77 operates the film drive in cassette 14. As here shown, the cassette 14 is a standard Kodak cassette which has been on the market for years and which is capable of presenting the film adjacent aperture 46 through an internal film gate by rotation of wheel 47 and frame by frame movement of the film by claw 48, through slit 49. The rotation of drive receiving element of specifically crown gear 47 is received from shaft 77 through drive gear 93, gear 94, and gear 96 which is connected through shaft 97 to a spring loaded crown gear 98.

The crown gear or equivalent spring loaded drive element is provided for coupling drive element 98 with drive receiving element 47 where they are out of matching relation. In such a case, the drive element 98 is moved with shaft 97 axially with respect to the other gears, the gear 96 being held in rotational relation with shaft 97 by a suitable key system. The shaft 97 and crown gear 98 are urged against crown gear 47 by leaf spring 100 (see FIG. 3) as gear 98 turns its meshes with gear 47 to bring the various drive elements together in proper synchronism.

The shutter claw 48 is also taken from a relatively conventional structure found in certain early Bell and Howell cameras, and consists essentially of gears 99, 101 and 102, all receiving rotation from drive gear 93, with gear 102 operating a crank 103. The crank 103 operates the claw 48 with its rotary motion adjusting the end 104 of claw 48, while the midportion 106 is adjusted through a post 107 following a cam 108. In this way, the claw moves into a hole provided in the film strip, pulls down drawing the film with it, moves out, and then moves upward to start a new cycle. Any suitable claw drive mechanism could be used, if desired, but we have found this Bell and Howell mechanism to be eminently reliable and satisfactory.

As is best seen in FIGS. 2 and 3, the flash mechanism of the preferred form is a ring-like gas tube 109 mounted in a suitable frame 111 which in turn is fit into the main pipe camera housing 13. Positioned behind gas tube 109 and in the frame 111 is a suitable reflector 112 formed for directing all of the light forwardly through the window 28. In order to prevent stray light from reflecting back from the surfaces window 28 toward the lens 16, a ring shaped rubber sealer 113 is provided to complete the light barrier between flashlight 109 and lens 16.

Flashlight 109 is also a conventional structure that may be purchased commercially, and is equipped with a suitable plug 114 (see FIG. 2) adapted to fit into a outlet 116 which in turn is supplied from the battery by conventional circuitry, with the exception of the safety switches placed next to the battery for isolation of the battery when the camera is not in use. These switches are provided at pulley 38 where they are actuated by the rope-like element 41.

Referring more particularly to FIG. 3, a pair of safety switches 117 are shown for achieving this purpose, said switches having spring loaded push buttons 118 bearing against transfer mechanisms 119 which in turn bear against the rope-like element 41. Thus as seen in FIGS. 3 and 4, rope-like element 41 pushes the element 119 laterally on the left hand side to move in push button 118 and actuate the switch. At the same time, the switch 117 on the right hand side is open, the push button 118 being in the extended position. With these switches, neither one is actuated when the rope-like element 41 is missing, so as to protect the battery, however, either switch will connect the battery into the circuit so that the battery is connected even if the operator chooses to move the camera backwards.

In order to load and unload the film easily, an access door 121 is provided in the camera mechanism section of the housing, with the access door being shaped with suitably matching bevelled edges 122 (see FIG. 5), so that the single fastening screw 123 will hold the door sealingly in closed position.

In order to operate the camera, a line is first brought through the sewer pipe 12 between manholes by utilizing any of the conventional techniques such as floating the line through the pipe. With the line establishing communication, heavier ropes and the like are passed through the pipe until the suitable cable 34 is provided between manholes for towing pipe to the camera. The holdfast structure 42 is then set up, with a rope-like element 41 being supplied for attachment to the pulley 38. Access door 121 is then opened, and a cassette 14 is placed in position. This is easily achieved by utilizing the spring loaded gear to mesh up with the drive receiving element of cassette 14 as described above. The access door 121 is then closed, rope like element 41 positioned around the pulley 38 so as to close the safety switch 117, the counter 73 either put in zero position on the starting position noted, and the camera is then ready to be towed through the pipe 12.

After the camera has been towed through the pipe 12, access door 121 is opened, cassette 14 removed for development of the film strip and a number of frames or distance on the counter noted. When the frames are developed, the interior of the pipe may be analyzed, and any trouble spots accurately located. While we have described moving the camera from a single manhole to the next, it will be appreciated that longer distances may be used, the only limit being the number of frames loadable into the particular cassette utilized.

While the camera shown in FIGS. 1 through 7 is excellent and reliable, it is sometimes desirable to provide adjustable skid mechanisms so that the camera may be utilized with different sized pipes. Accordingly, a pipe camera 11a is shown in FIG. 8 having skids 32a attached by connecting members 33a. These skids also contain a pair of axially extending members having their ends bent to climb over obstructions. However, in this form the ends are ski-like rather than connected as shown in FIG. 1, although it will be appreciated that the ends could be connected, or that the form of FIG. 1 could be ski-shaped, if desired.

As shown in FIG. 8, the connecting members 33a connect to a split collar 126 and each half of each split collar may contain additional skids 32a. With this construction, various sizes of runners can be provided and attached to the camera so that the camera may be centered in different sized pipes. It may be noted that the open ends are not formed to receive the cable 34 directly, but it will be appreciated that when the ends are open as shown in FIG. 8, the cable 34 can be attached to a suitable loop of cable or the like which in turn can be looped behind the two forward connecting members 32a to provide a towing attachment.

A four runner or double skid device as shown in FIG. 8 is also valuable if the pipe camera is utilized in a vertical pipe for inspection of such pipes. When used in a vertical pipe such as an oil well, the tension of line 41 is adjusted by the braking means 44 so as to match the tension in the tow cable, (note that both the tow cable and the rope come from the same side of the camera) in order to balance the weight and tend to hold the camera vertical. While certain specific use examples have been given in order to illustrate the best way of using the invention, it will be apparent to those skilled in the art that various other methods of use are also advantageous.

From the foregoing description, it is seen that we have provided a pipe camera which is built for reliable operation so as to provide exceedingly accurate results, even when utilized by relatively unskilled users.

We claim:
1. A pipe camera for photographing the interior of a pipe or the like at regular intervals, comprising
 a water-tight housing carrying a film drive mechanism, lens and flash mechanism, tow means for moving the camera through the pipe, and
a camera drive mechanism operative independently from the tow means but responsive to the motion of the pipe camera for driving the camera parts whereby pictures are taken at accurately spaced intervals; said camera drive mechanism comprising a pulley rotatably mounted on the housing and having a shaft sealingly extending through the housing, pulley drive means in the form of a rope-like element adapted to be anchored at one end, wrapped around the pulley at an intermediate portion, and played out in taut fashion at the other end whereby axial movement of the camera through the pipe is positively and accurately related to the rotation of the pulley, and a train of drive elements operatively connected to the pulley and to the film drive mechanism and flash mechanism.

2. A pipe camera as defined in claim 1, in which the train of drive elements includes a counter drive gear, an in which a counter is provided in operative connection to said gear for accurately recording the camera movement.

3. A pipe camera as defined in claim 1, in which the housing also carries a shutter having actuating means connected to the train of drive elements for synchronous operation with the film drive mechanism and the flash mechanism.

4. A pipe camera as defined in claim 1 in which the train of drive elements includes a pair of one-way clutches arranged for providing a single direction of rotation at the driven end of the train corresponding to the rotation of the pulley in either direction.

5. A pipe camera as defined in claim 1, in which a battery is provided to energize the flash mechanism, and in which safety switch means is also provided adjacent the pulley for supplying energy from the battery only when the pulley has the rope-like element in operative position.

6. A pipe camera as defined in claim 1, in which the housing is generally cylindrical and has a window at one end with the flash mechanism positioned to shine light through said window, said lens also being positioned to receive exposure light through said window.

7. A pipe camera as defined in claim 6, in which sealing means are provided to separate the light source of the flash mechanism from the lens, said sealing means being positioned against the window and formed to substantially prevent the light reflecting from the surfaces of the window from reaching the lens.

8. A pipe camera for photographing the interior of a pipe or the like at regular intervals, comprising
a water-tight housing carrying a film drive mechanism, a lens, a shutter, a shutter trip arm, and a flash mechanism,
said water-tight housing being generally cylindrical and having a window at one end for transmitting light from the flash mechanism and also transmitting light to the lens,
a skid means carried on the housing for supporting the housing axially within the pipe,
said skid means comprising
    a pair of elongated runners extending axially along the housing;
tow means operatively attached to the skid means for moving the camera through the pipe, and
a camera drive mechanism responsive to the motion of the housing for driving the camera parts whereby pictures are taken at accurately spaced intervals; said camera drive mechanism, comprising
    a pulley rotatably mounted on the housing and having a shaft sealingly extending through the housing, and a train of drive elements operatively connected to the pulley and to the shutter trip arm and film drive mechanism.

9. A pipe camera as defined in claim 8, which also comprises a leaf spring rotatably mounted in said housing and operatively connected to said gear train for rotation therewith said leaf spring also being mounted so that on rotation it will abut a cocking stop, and snap off as it rotates to strike the shutter trip arm.

10. A pipe camera as defined in claim 9, in which the flash mechanism comprises a switch in position to be actuated by the shutter trip arm.

11. A pipe camera for photographing the interior of a pipe or the like at regular intervals, comprising
a water-tight housing having a window at one end thereof,
means for moving the pipe camera through the pipe,
a camera mechanism mounted entirely within the housing,
said camera mechanism, comprising
    a film drive system having drive receiving elements capable of driving the film accurately frame by frame through an exposure position,
    a lens system, and
    a flash mechanism; and
a camera drive mechanism operative independently from the means for moving the camera but responsive to the motion of the camera, said camera drive mechanism, comprising
    a pulley mounted on the housing and having a shaft sealingly extending therethrough,
pulley drive means in the form of a rope-like element adapted to be anchored at one end, wrapped around the pulley at an intermediate portion, and played out in taut fashion at the other end whereby axial movement of the camera through the pipe is positively and accurately related to the rotation of the pulley, and
a gear train operatively connected to the pulley and to the drive receiving elements of the film drive mechanism and to the flash mechanism.

12. A pipe camera as defined in claim 11, in which the gear train includes a counter drive gear, and in which a counter is provided in operative connection to said gear for accurately recording the camera movement.

13. A pipe camera as defined in claim 11, in which the housing also carries a shutter having actuating means operatively connected to the gear train for synchronous operation with the film drive mechanism and the flash mechanism.

14. A pipe camera as defined in claim 11, in which the gear train is constructed with a pair of one-way clutches arranged with said elements for providing a single direction of rotation at the driven end of the gear train corresponding to the rotation of the pulley in either direction.

15. A pipe camera as defined in claim 11, in which a battery is provided to energize the flash mechanism, and in which safety switch means is also provided adjacent the pulley for supplying energy from the battery only when the pulley has the rope-like element in operative position.

16. A pipe camera as defined in claim 11, in which the housing is generally cylindrical and has the window at one end with the flash mechanism positioned to shine light through said window, said lens also being positioned to receive exposure light through said window.

17. A pipe camera as defined in claim 16, in which sealing means are provided to separate the light source of the flash mechanism from the lens, said sealing means being positioned against the window and formed to substantially prevent the light reflecting from the surface of the window from reaching the lens.

(References on following page)

References Cited

UNITED STATES PATENTS

| | | | |
|---|---|---|---|
| 1,589,436 | 6/1926 | Seebold | 95—11 |
| 1,912,485 | 6/1933 | Kothny | 95—11 UX |
| 2,737,864 | 3/1956 | Gutterman et al. | 95—11 |
| 2,933,024 | 4/1960 | Baggs et al. | 95—11 |
| 3,244,085 | 4/1966 | Pulfer | 95—11 |
| 3,377,934 | 4/1968 | Crichton et al. | 95—11 |
| 3,426,663 | 2/1969 | Fox | 95—11 |

SAMUEL S. MATTHEWS, Primary Examiner

F. L. BRAUN, Assistant Examiner

U.S. Cl. X.R.

95—11 HC